United States Patent
Jackowski (10) Patent No.: US 11,421,607 B1
(45) Date of Patent: Aug. 23, 2022

(54) FIBER OPTIC EXIT AREA SENSING FOR GAS TURBINE ENGINE NOZZLES

(71) Applicant: Raytheon Technologies Corporation, Farmington, CT (US)

(72) Inventor: Jason J. Jackowski, Tucson, AZ (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 17/344,123

(22) Filed: Jun. 10, 2021

(51) Int. Cl.
| F02C 9/48 | (2006.01) |
| F02K 1/16 | (2006.01) |
| F02K 1/17 | (2006.01) |
| F04D 27/00 | (2006.01) |
| G01L 1/24 | (2006.01) |

(52) U.S. Cl.
CPC ............... *F02C 9/48* (2013.01); *F02K 1/165* (2013.01); *F02K 1/17* (2013.01); *F04D 27/001* (2013.01); *F05D 2220/323* (2013.01); *F05D 2270/30* (2013.01); *G01L 1/242* (2013.01)

(58) Field of Classification Search
CPC ... F02K 1/06; F02K 1/17; F02K 1/165; F05D 2270/30; F05D 2220/323; G01L 1/242; F04D 27/001; F02C 9/48; G02B 6/3632; G02B 6/3664; G02B 6/3668
See application file for complete search history.

(56) References Cited

U.S. PATENT DOCUMENTS

| 3,852,741 A | 12/1974 | McDonald |
| 8,235,325 B2 * | 8/2012 | Schafer .............. F02K 1/1207 60/242 |
| 9,551,295 B2 | 1/2017 | Gormley |
| 9,803,586 B1 * | 10/2017 | Jackowski .............. F01D 25/24 |
| 9,890,739 B2 | 2/2018 | Jackowski et al. |
| 10,184,425 B2 | 1/2019 | Jackowski et al. |
| 10,295,420 B2 | 5/2019 | Wood et al. |
| 2017/0218882 A1 * | 8/2017 | Jackowski .............. G01L 1/242 |
| 2019/0338666 A1 * | 11/2019 | Finn ...................... G06T 3/4038 |
| 2021/0132254 A1 | 5/2021 | Schleif et al. |

(Continued)

OTHER PUBLICATIONS

Video: Real-Time Shape and Position Sensing. Luna Innovations. Published to YouTube Mar. 14, 2016. Retrieved Jun. 9, 2021 from https://www.youtube.com/watch?v=6Y7yOUXflvs.

(Continued)

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A gas turbine engine has a fan case exit and an inner core housing exit. At least one of the exits is provided with a fiber optic sensing unit. The fiber optic sensing unit includes a fiber optic sensing member surrounding a circumference of the at least one of the exits. A control is programmed to calculate a nozzle area at the at least one of the exits based upon the displacement of the fiber optic sensing member. The calculated nozzle area is utilized to update nozzle area information at an electronic engine controller for the engine, and the electronic engine controller is programmed to control at least one associated component on a gas turbine engine based upon the updated nozzle area. A method is also disclosed.

20 Claims, 5 Drawing Sheets

(56) References Cited

U.S. PATENT DOCUMENTS

2021/0164359 A1* 6/2021 Shenouda ................ G01B 7/14

OTHER PUBLICATIONS

Website: OFS. Fiber Optic Sensing. Retrieved Jun. 9, 2021 from https://www.ofsoptics.com/sensing/.
Website: Luna. Sensing and Non-Destructive Test Products. Retrieved Jun. 9, 2021 from https://lunainc.com/product-category/sensing-and-non-destructive-test-products.
Website: HBM. Optical Interrogators for Fiber Optic Sensing. Retrieved Jun. 9, 2021 from https://www.hbm.com/en/2322/optical-interrogators/.
Website: Sensuron. What is Fiber Optic Sensing? Retrieved Jun. 9, 2021 from https://www.sensuron.com/fiber-sensing-basics/.
Website: Fraunhofer HHI. Fiber Optical Sensor Systems. Retrieved Jun. 9, 2021 from https://www.hhi.fraunhofer.de/en/departments/fiber-optical-sensor-systems/.
Technobis. Fiber Optic Sensing Solutions. Product Catalog 2018. pp. 1-16.

* cited by examiner

FIBER OPTIC EXIT AREA SENSING FOR GAS TURBINE ENGINE NOZZLES

BACKGROUND

This application relates to a method of determining an exit area at nozzles on gas turbine engines. An engine having such capability is also disclosed.

Gas turbine engines are known, and typically include a fan delivering air into a fan case as bypass air. The fan also delivers air into a core housing which is radially inward of the fan case, and where it is delivered to a compressor. The compressor compresses the air and delivers it into a combustor where it is mixed with fuel and ignited. Products of this combustion pass downstream over turbine rotors, causing them to rotate and drive the fan and compressor.

Modern gas turbine engines are controlled with very detailed control algorithms. The algorithms attempt to achieve the most efficient operation of the engine. However, gas turbine engines are subject to extreme changes in stress and strain dependent on operational conditions.

Fiber optic shape sensing is known and can be used to monitor the changing shape of components.

It has been proposed to use fiber optic shape sensing equipment on gas turbine engines that have a variable exit nozzle. In such a nozzle pedals pivot radially inwardly and outwardly to change an exit area. The fiber optic shape sensors monitor the actual position of the pedals relative to a desired position and communicate with a control. The control may then change the position of the pedals further to achieve the desired position.

SUMMARY

In a featured embodiment, a gas turbine engine includes a fan surrounded by a fan case. An inner core housing is radially inward of the fan case. The fan delivers air into a bypass duct between the inner core housing and the fan case, and further delivering air into the inner core housing. The inner core housing including a compressor section, a turbine section and a combustor. There is a fan case exit at a downstream end of the fan case and an inner core housing exit at a downstream end of the inner core housing. Both the fan case exit and the inner core housing exit provide fixed nozzles, and at least one of the fan case exit and the inner core housing exit are provided with a fiber optic sensing unit. The fiber optic sensing unit includes a fiber optic sensing member surrounding a circumference of the at least one of the exits. The fiber optic sensing member communicates with a light source and a receiver. The light source is configured to deliver light into the fiber optic sensing member. The receiver is configured to receive reflected light information from the fiber optic sensing member. A control utilizes the received reflective light information, and measure strain from the information. The control is further programmed to determine a displacement of the fiber optic shape sensing member based upon the measured strain, and programmed to calculate a nozzle area at the at least one of the exits based upon the displacement. The calculated nozzle area is utilized to update nozzle area information at an electronic engine controller for the engine, and the electronic engine controller is programmed to control at least one associated component on a gas turbine engine based upon the updated nozzle area.

In another embodiment according to the previous embodiment, the measured strain is measured in the receiver.

In another embodiment according to any of the previous embodiments, the calculation of nozzle area is performed in the electronic engine control.

In another embodiment according to any of the previous embodiments, the at least one component includes a fuel supply system.

In another embodiment according to any of the previous embodiments, the at least one component also includes at least one variable angle guide vane.

In another embodiment according to any of the previous embodiments, the at least one component also includes at least one of a shaft speed control and a turbine tip clearance bleed air control.

In another embodiment according to any of the previous embodiments, the fan case exit includes one the fiber optic sensing unit.

In another embodiment according to any of the previous embodiments, the updated nozzle area is updated in real time at the control.

In another embodiment according to any of the previous embodiments, the calculated nozzle area is calculated on a first engine and utilized to program a controller for other engines.

In another featured embodiment, a method of operating a gas turbine engine includes providing a fiber optic sensing member around the circumference of on at least one of a fan case exit and an inner core housing exit in a gas turbine engine. The fan case exit and the inner core housing exit provide fixed nozzles. Light is transmitted from a light source through the fiber optic sensing member. Reflected light is received from the fiber optic sensing member at a receiver. Strain is measured from the reflected light, and determines displacement of the fiber optic sensing member. Displacement is determined of the at least one exit from the measured strain. A nozzle inner area is calculated at the at least one exit based upon the displacement. The calculated nozzle inner area is utilized to update a control for the gas turbine engine to control at least one component.

In another embodiment according to any of the previous embodiments, the measured strain is measured in the receiver.

In another embodiment according to any of the previous embodiments, the calculation of nozzle area is performed in an electronic engine controller.

In another embodiment according to any of the previous embodiments, the at least one component includes a fuel supply system.

In another embodiment according to any of the previous embodiments, the at least one component also includes at least one variable angle guide vane.

In another embodiment according to any of the previous embodiments, the at least one component also includes at least one of a shaft speed control and a turbine tip clearance bleed air control.

In another embodiment according to any of the previous embodiments, the fan case exit is operated with steps (a)-(g).

In another embodiment according to any of the previous embodiments, steps (a)-(g) are performed on a first engine, and are utilized to program controls for other gas turbine engines.

In another embodiment according to any of the previous embodiments, the first engine is flown through a series of changing conditions, and changes in the nozzle area are calculated and stored as the conditions change.

In another embodiment according to any of the previous embodiments, the changing conditions include changes in at least one of Mach, altitude of an associated aircraft, and a speed of the engine.

In another embodiment according to any of the previous embodiments, steps (b)-(g) occur in real time as an aircraft flying with the gas turbine engine.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
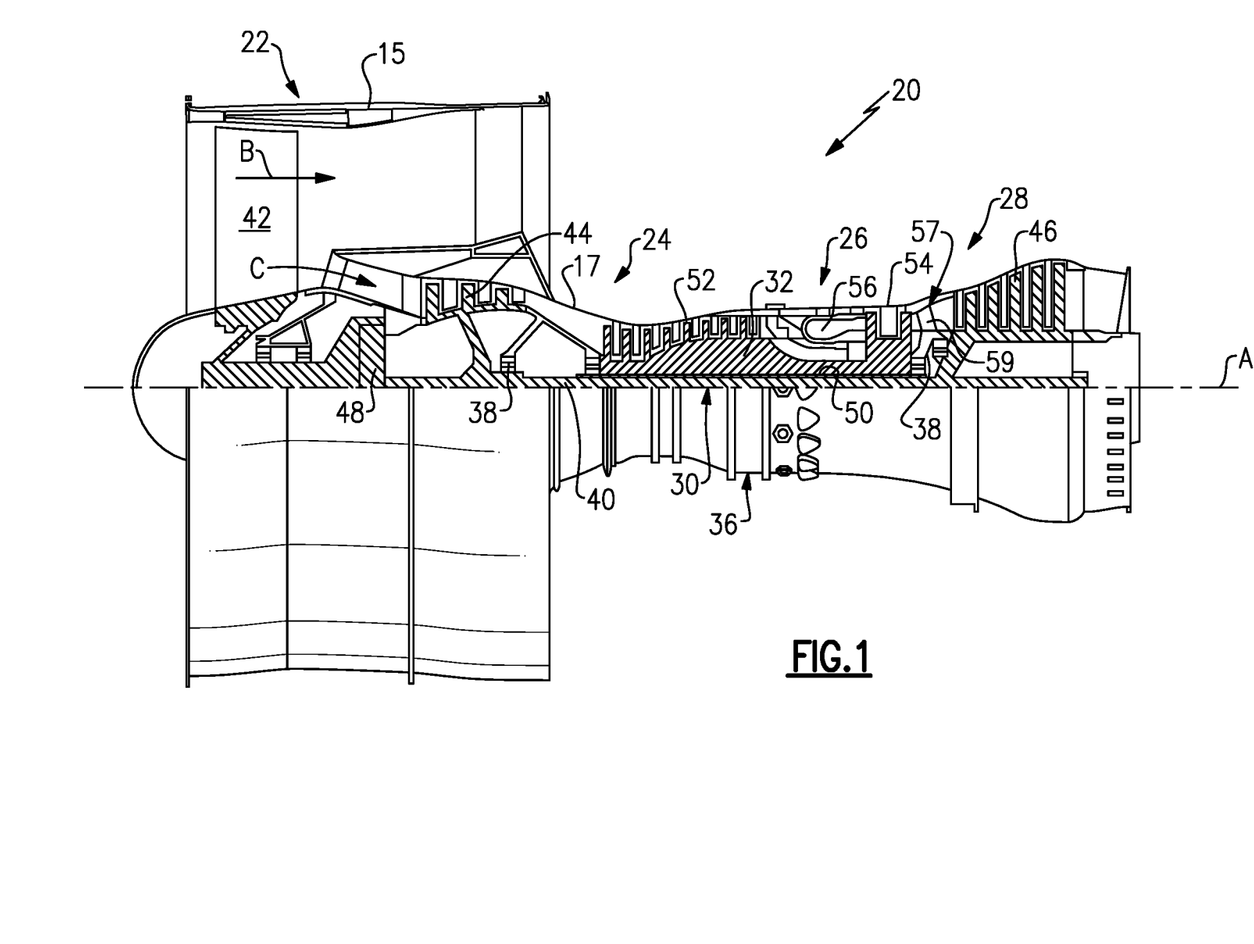
FIG. 1 schematically shows a gas turbine engine that may benefit from this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. A core outer housing 17 surrounds the core flow path. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2A:
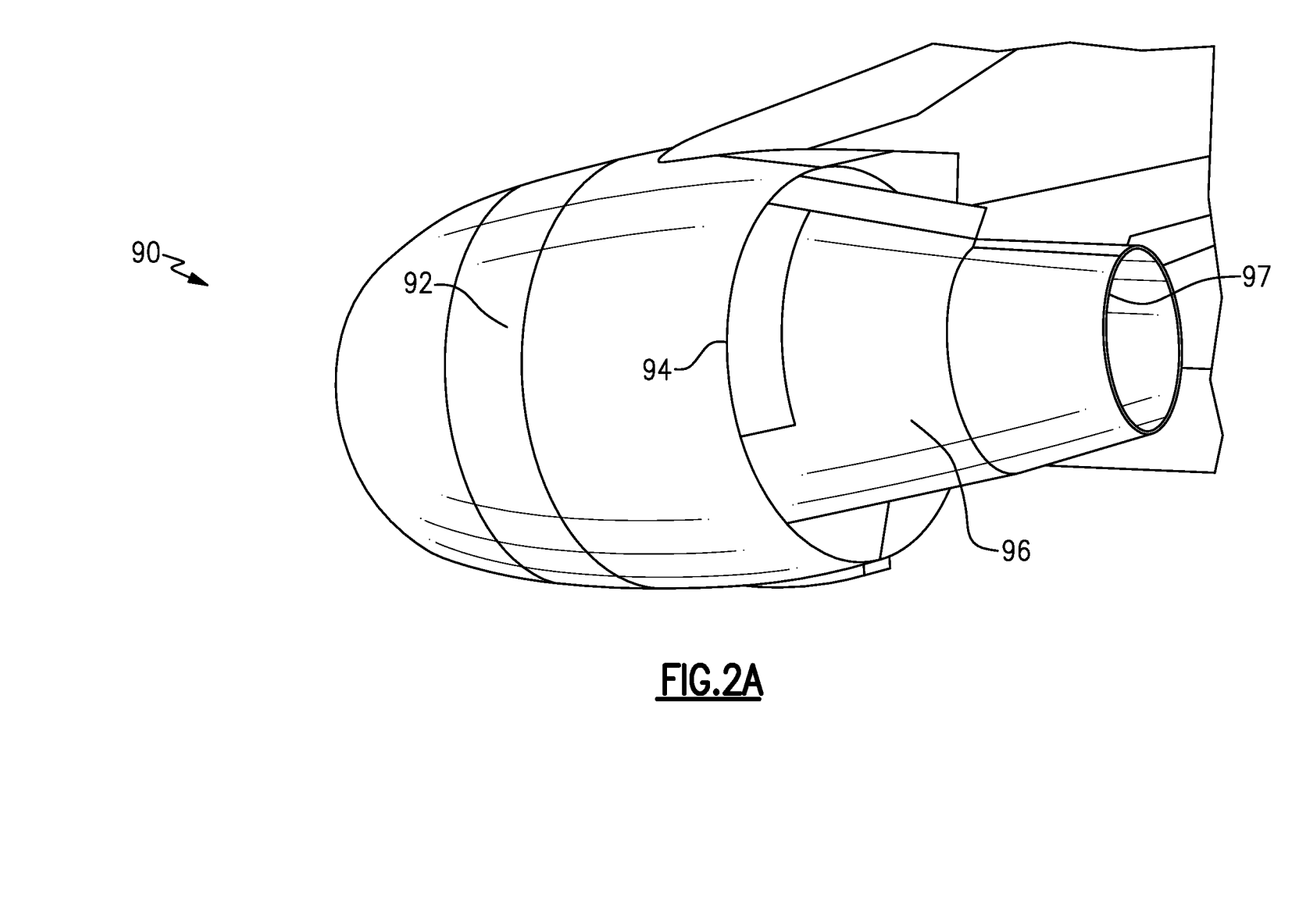
FIG. 2A shows an outer view of a gas turbine engine.

FIG. 2A shows an engine 90 having a fan case or outer housing 92. An exit 94 of the fan case defines an end of the bypass duct as explained above with regard to FIG. 1. A core housing 96 has an exit 97 which defines the end of the overall engine. Exits 94 and 97 each define a nozzle. These are "fixed" nozzles, as opposed to variable area nozzles.

Figure 2B:
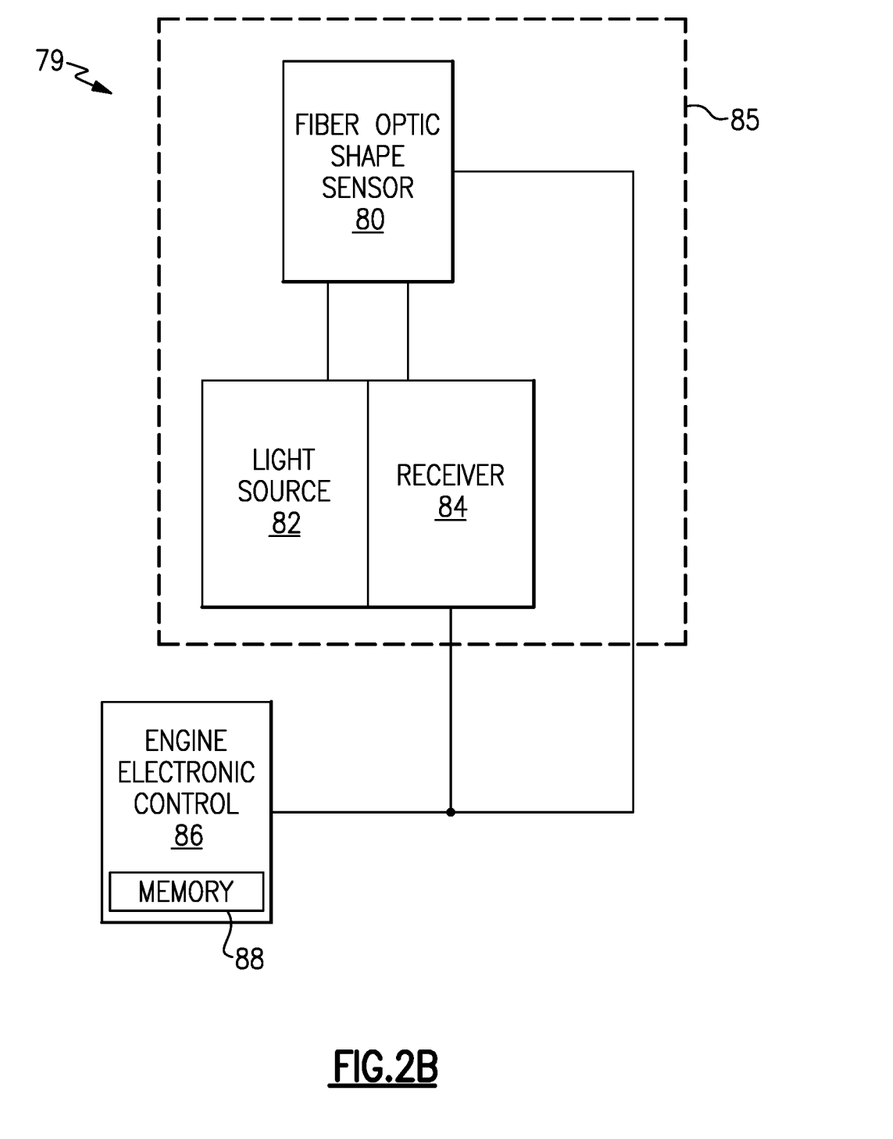
FIG. 2B shows structure that may be incorporated into the FIG. 2A engine, or the FIG. 1 engine.

FIG. 2B schematically discloses a system 79 that may be incorporated into the FIG. 2A engine. A fiber optic sensing member 80 is placed at one, or both exits 94 and 97. The fiber optic sensing member communicates with a light source 82, and a receiver 84. In combination, fiber optic sensing member, light source 82 and receiver 84 could be called a shape sensing unit 85. The receiver communicates with a control such as the electronic engine control 86. The electronic engine control 86 may be a full authority digital electronic controller which is utilized to control the entire engine 90. The electronic engine control 86 may have a memory 88.

Figure 2C:
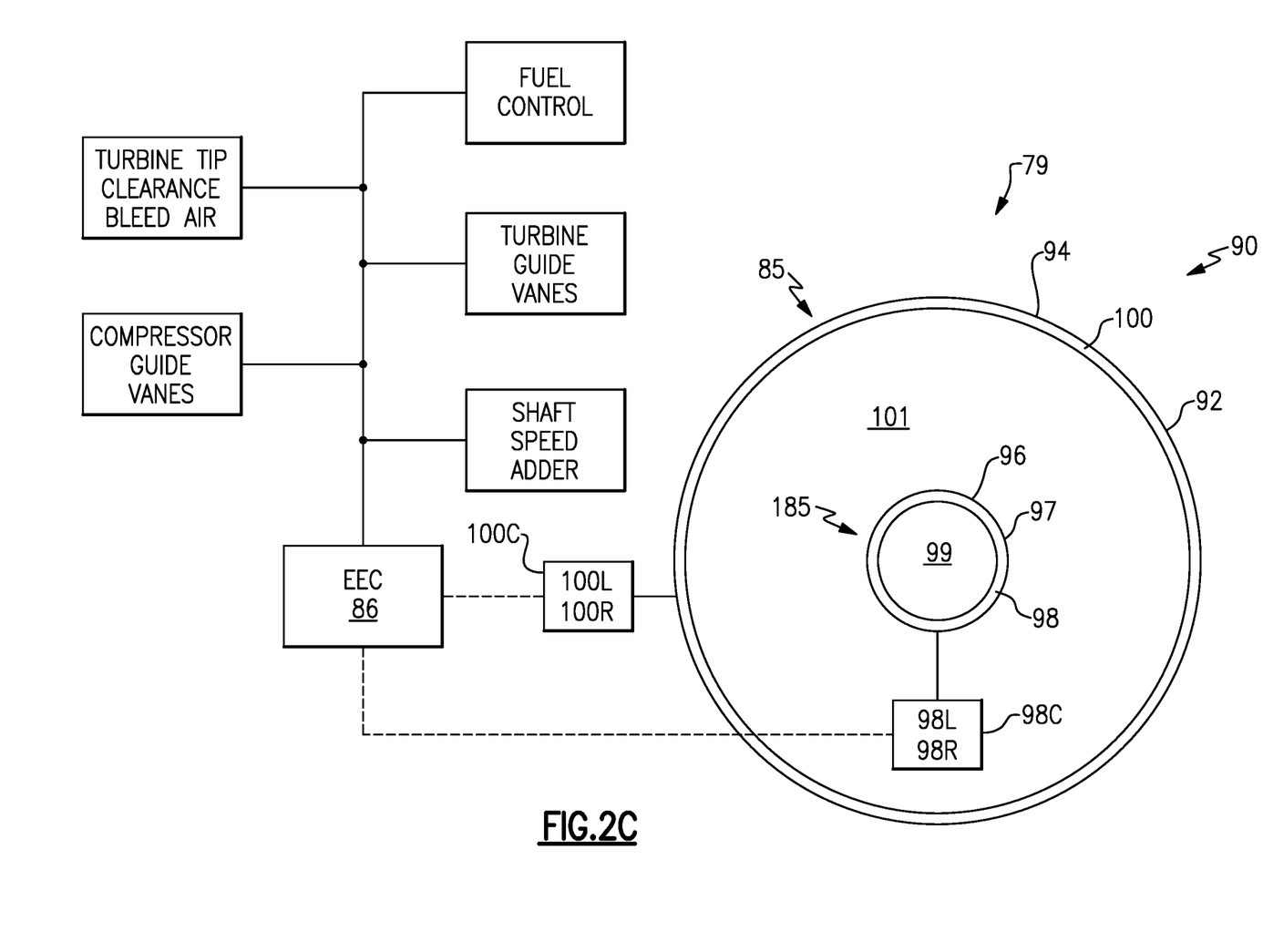
FIG. 2C is an end view of the engine.

As shown in FIG. 2C, the engine 90 has two shape sensing units 85 and 185. The exit 97 of the core housing is provided with a first fiber optic sensing unit 185. There is an internal area 99 within the exit 97 that will be calculated and sensed by the shape sensing unit 185, as explained below. The exit 94 is provided with a shape sensing unit 85 which acts to determine the area 101 outward of the core housing 96, and inward of the fan outer housing 92.

While shape sensing units are disclosed and associated with both nozzles 94 and 97, this disclosure extends to engines where a shape sensing unit is only associated with one nozzle.

The fiber optic shape sensing member 100 communicates with control 100C. The control 100C may include a light source 100L and a receiver 100R. The fiber optic shape sensing member communicates with a control 98C. Control 98C may have its own light source 98L and receiver 98B. Both controls 100C and 98C communicate with the electronic engine controller (EEC) 86.

A control sensing system 79 includes the fiber optic shape sensing units 85 and 185.

The light sources are configured to direct a light through the fiber optic sensing members. For example, the light source may comprise a wave length tunable laser. It should be understood that other types of lasers and light sources may be utilized.

The receiver is configured to receive a reflective light from fiber optic sensing members 100 and 98, and measure a strain along the fiber optic sensing members based on the reflected light in real time.

The fiber optic sensing members 100 and 98 are configured to transmit the light from the light sources, and they may each comprise an optical fiber that includes fiber optic sensing devices. For example, a single optical fiber may include thousands of fiber sensing devices along a length of the fiber. Of course, more or less fiber optic sensing devices may be utilized. The sensing devices are used to obtain strain measurement data at several points along the length of the optical fiber.

Fiber optic sensing devices may comprise a plurality of Fiber Bragg gratings, Optical Frequency Domain Reflectometry (OFDR) technology and alike. In fact, appropriate fiber optic shape sensing technologies are available from any number of companies, and a number of such companies are disclosed in an Information Disclosure Statement filed concurrently with this application. Fiber Bragg gratings are configured to reflect predetermined wavelengths of light. OFDR technology uses gratings disposed side by side along the optical fiber to provide a fully distributed sensing fiber. Changes in the reflective lights wavelength directly correspond to the implied strain on the fiber optic sensing member. That strain correlates to changes in position of the fiber optic sensing members 100 and 98, and may be utilized to in turn determine the area within the fiber optic sensing members.

The reflected light from the fiber optic sensing members is detected from the receivers 100R and 98R.

The receivers may comprise data acquisition hardware and a processor based device with an associated memory. Other types of receivers may be utilized. Software, such as strain to displacement algorithms may be programmed into the memory of the receivers (or the electronic engine control). From the light reflected by the fiber optic sensing member in the optical fiber of the fiber optic sensing member 98/100, the receivers 98R and 100R may detect wavelength shifts, time delays and other strain measurement data as light passes along the length of the fiber optic sensing members 98 and 100.

By measuring real time strain in the fiber optic sensing members 98 and 100, the receiver can determine a displacement of the fiber optic sensing members, and thereby a displacement of the exits 94 and 97 of the fan case 92 and core housing 96. This can then be utilized to determine the areas within the fiber optic sensing members 98 and 100.

This provides improved control of the gas turbine engine at the electronic engine control 86. In particular, the exit area of the nozzles is an important factor in determining the thrust of an engine, and can also provide guidance as to position of a number of components in the engine such as the speed of the shafts, the position of variable compressor guide vanes or turbine guide vanes, and the operation of turbine tip clearance bleed air. The exit area also impacts on fuel control.

Historically, a so-called "fixed nozzle" has had its exit air assumed to be constant. In fact, modern gas turbine engine fan cases and core housings are somewhat flexible and their position can change and deform due to aerodynamic forces that are changing. As an example, the exit may deform to different positions based upon changes in Mach conditions, altitude and speed of the engine and associated aircraft.

This disclosure provides a designer the ability to accurately know the exit areas, and update the electronic engine controller 86 such that the most efficient operation of the engine can be achieved.

Now, returning to FIG. 2C, the controls 98C and 100C, and in particular their receivers 100R and 98R communicate with the electronic engine control 86. The electronic engine control 86 is shown communicating with a fuel control. By knowing the exact areas 99 and 100 the electronic engine control 86 can determine the most desirable amount of fuel to be delivered to the combustor (see FIG. 1) to achieve the most efficient operation of the engine dependent on the changing exit areas 99 and 101. The electronic engine control 86 is shown to optionally control turbine tip clearance bleed air, and the position of variable guide vanes for both the turbine and compressor. In addition, the electronic engine control 86 may change the speed of shafts based upon the information provided to it by the receivers 98R and 100R.

Thus, the most efficient operation may be achieved.

As mentioned above, fiber optic shape sensing has been proposed for gas turbine engines with variable area nozzles. However, the information has not been utilized for fixed nozzles, or to modify or update a control for the component such as the fuel pump, etc. Instead, it was simply utilized as feedback as the position of the pedals in the variable area nozzle change.

Figure 3:
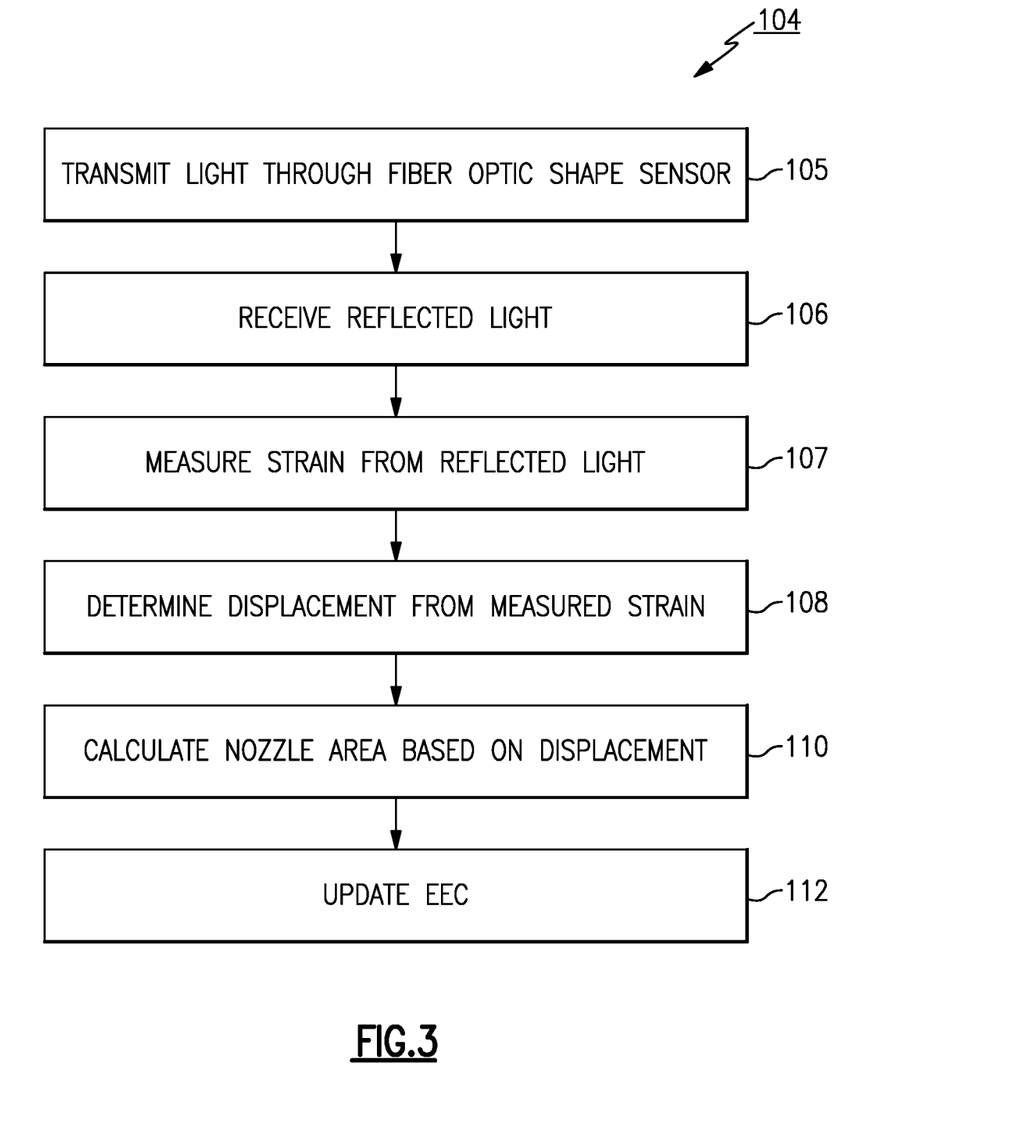
FIG. 3 is a flowchart of a disclosed method.

A flow chart 104 is shown in FIG. 3.

As shown at step 105, light is transmitted through the fiber optic sensing member. The reflected light is received at step 106. The strain from the reflected light is measured at step 107. Its displacement is determined from the measured strain at step 108. The nozzle area can be calculated based upon this displacement at step 110. The electronic engine control is updated with the displacement information at step 112.

The step 112 has two distinct embodiments.

In one embodiment, the exit area sensor system 79 is provided on field gas turbine engines, and operate in real time to continuously update the electronic engine control on the respective engines. There may be a weight penalty for including this additional equipment, however, the improved fuel efficiency and other efficiencies achieved should justify this weight penalty.

On the other hand, the method of FIG. 3 may be performed on a test engine, to determine the expected change in the exit areas across various flight regimes. This can then be programmed into the electronic engine control on the field engines based upon the test findings.

That is, a test gas turbine engine can operate at varying Mach altitude and speeds, along with other operational regimes, and the resultant changes in the exit areas can be determined. This test information can then be utilized when programming the electronic engine control for field engines, such that the electronic engine control for the field engines are not provided with changes of the exit areas in real time. Instead, the field engine controllers used stored changes that can be expected based upon the test engine information.

In either embodiment the controller 86 is programmed to control the engine using exit area information.

Although embodiments of this invention have been disclosed, a worker of ordinary skill in this art would recognize that certain modifications would come within the scope of this disclosure. For that reason, the following claims should be studied to determine the true scope and content of this disclosure.

What is claimed is:

1. A gas turbine engine comprising:
a fan surrounded by a fan case:
an inner core housing radially inward of said fan case, and said fan delivering air into a bypass duct between said inner core housing and said fan case, and further delivering air into said inner core housing;
said inner core housing including a compressor section, a turbine section and a combustor;
there being a fan case exit at a downstream end of the fan case and an inner core housing exit at a downstream end of said inner core housing, and both said fan case exit and said inner core housing exit provide fixed nozzles, and at least one of said fan case exit and said inner core housing exit being provided with a fiber optic sensing unit;
said fiber optic sensing unit including a fiber optic sensing member surrounding a circumference of said at least one of said exits, said fiber optic sensing member communicating with a light source and a receiver, said light source configured to deliver light into said fiber optic sensing member, and said receiver being configured to receive reflected light information from said fiber optic sensing member; and
a control for utilizing the received reflective light information, and measure strain from the information, said control further programmed to determine a displacement of the fiber optic shape sensing member based upon the measured strain, and programmed to calculate a nozzle area at said at least one of said exits based upon the displacement, said calculated nozzle area being utilized to update nozzle area information at an electronic engine controller for the engine, and said electronic engine controller being programmed to control at least one associated component on a gas turbine engine based upon the updated nozzle area.

2. The gas turbine engine as set forth in claim 1, wherein said measured strain is measured in said receiver.

3. The gas turbine engine as set forth in claim 2, wherein the calculation of nozzle area is performed in the electronic engine control.

4. The gas turbine engine as set forth in claim 1, wherein said at least one component includes a fuel supply system.

5. The gas turbine engine as set forth in claim 4, wherein said at least one component also includes at least one variable angle guide vane.

6. The gas turbine engine as set forth in claim 4, wherein said at least one component also includes at least one of a shaft speed control and a turbine tip clearance bleed air control.

7. The gas turbine engine as set forth in claim 1, wherein said fan case exit includes one said fiber optic sensing unit.

8. The gas turbine engine as set forth in claim 1, wherein the updated nozzle area is updated in real time at the control.

9. The gas turbine engine as set forth in claim 1, wherein the calculated nozzle area is calculated on a first engine and utilized to program a controller for other engines.

10. A method of operating a gas turbine engine comprising of:
(a) providing a fiber optic sensing member around the circumference of on at least one of a fan case exit and an inner core housing exit in a gas turbine engine, said fan case exit and said inner core housing exit providing fixed nozzles;
(b) transmitting light from a light source through said fiber optic sensing member;
(c) receiving reflected light from said fiber optic sensing member at a receiver;
(d) measuring strain from the reflected light, and determining displacement of the fiber optic sensing member;
(e) determine displacement of the at least one exit from the measured strain;
(f) calculating a nozzle inner area at the at least one exit based upon said displacement; and
(g) utilize said calculated nozzle inner area to update a control for said gas turbine engine to control at least one component.

11. The method as set forth in claim 10, wherein said measured strain is measured in said receiver.

12. The method as set forth in claim 11, wherein the calculation of nozzle area is performed in an electronic engine controller.

13. The method as set forth in claim 10, wherein said at least one component includes a fuel supply system.

14. The method as set forth in claim 13, wherein said at least one component also includes at least one variable angle guide vane.

15. The method as set forth in claim 13, wherein said at least one component also includes at least one of a shaft speed control and a turbine tip clearance bleed air control.

16. The method as set forth in claim 15, wherein said fan case exit is operated with steps (a)-(g).

17. The method as set forth in claim 10, wherein steps (a)-(g) are performed on a first engine, and are utilized to program controls for other gas turbine engines.

18. The method as set forth in claim 17, wherein said first engine is flown through a series of changing conditions, and changes in the nozzle area are calculated and stored as the conditions change.

19. The method as set forth in claim 18, wherein said changing conditions include changes in at least one of Mach, altitude of an associated aircraft, and a speed of the engine.

20. The method as set forth in claim 10, wherein steps (b)-(g) occur in real time as an aircraft flying with the gas turbine engine.

* * * * *